March 14, 1939.  A. H. FURNISH  2,150,371
FREIGHT TRANSPORTING MECHANISM
Filed May 31, 1935  3 Sheets—Sheet 2
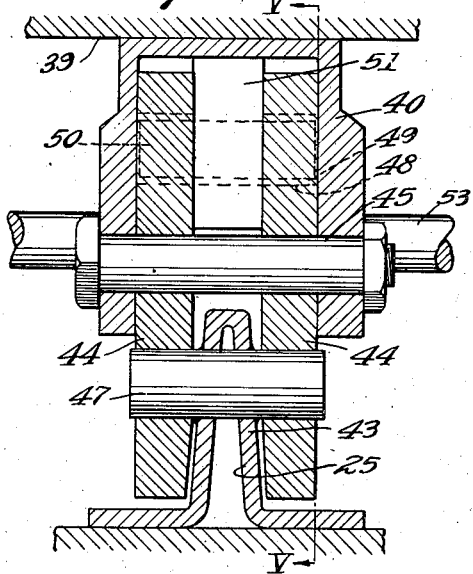
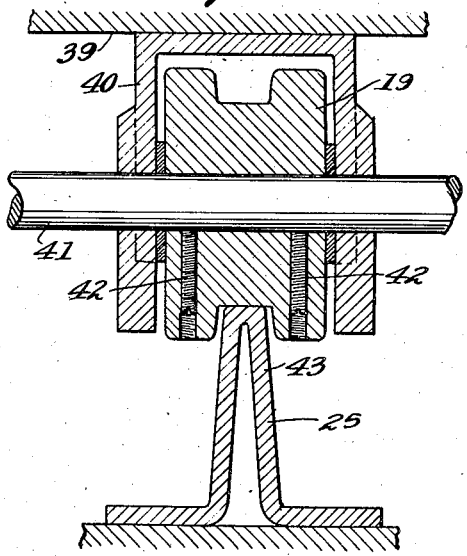
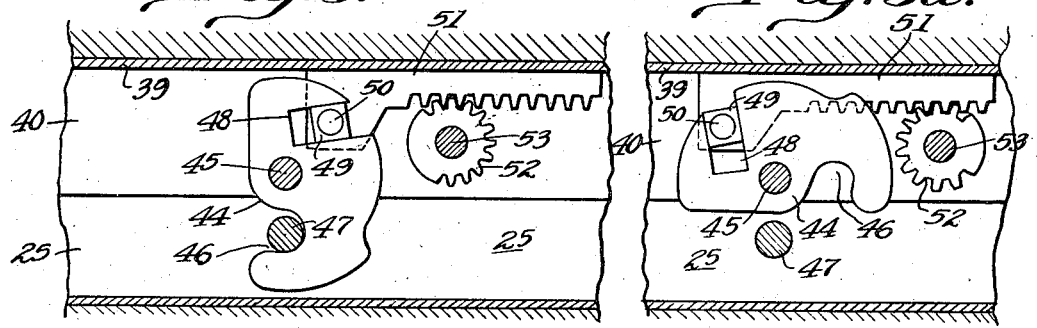
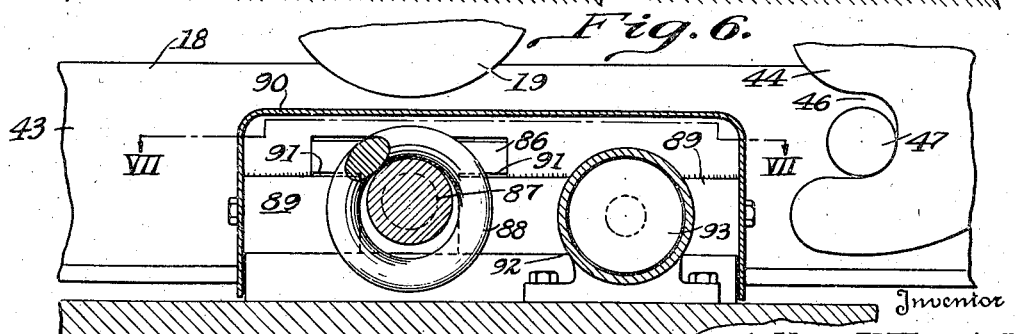
Inventor
Arthur H Furnish
By W S McDowell
Attorney

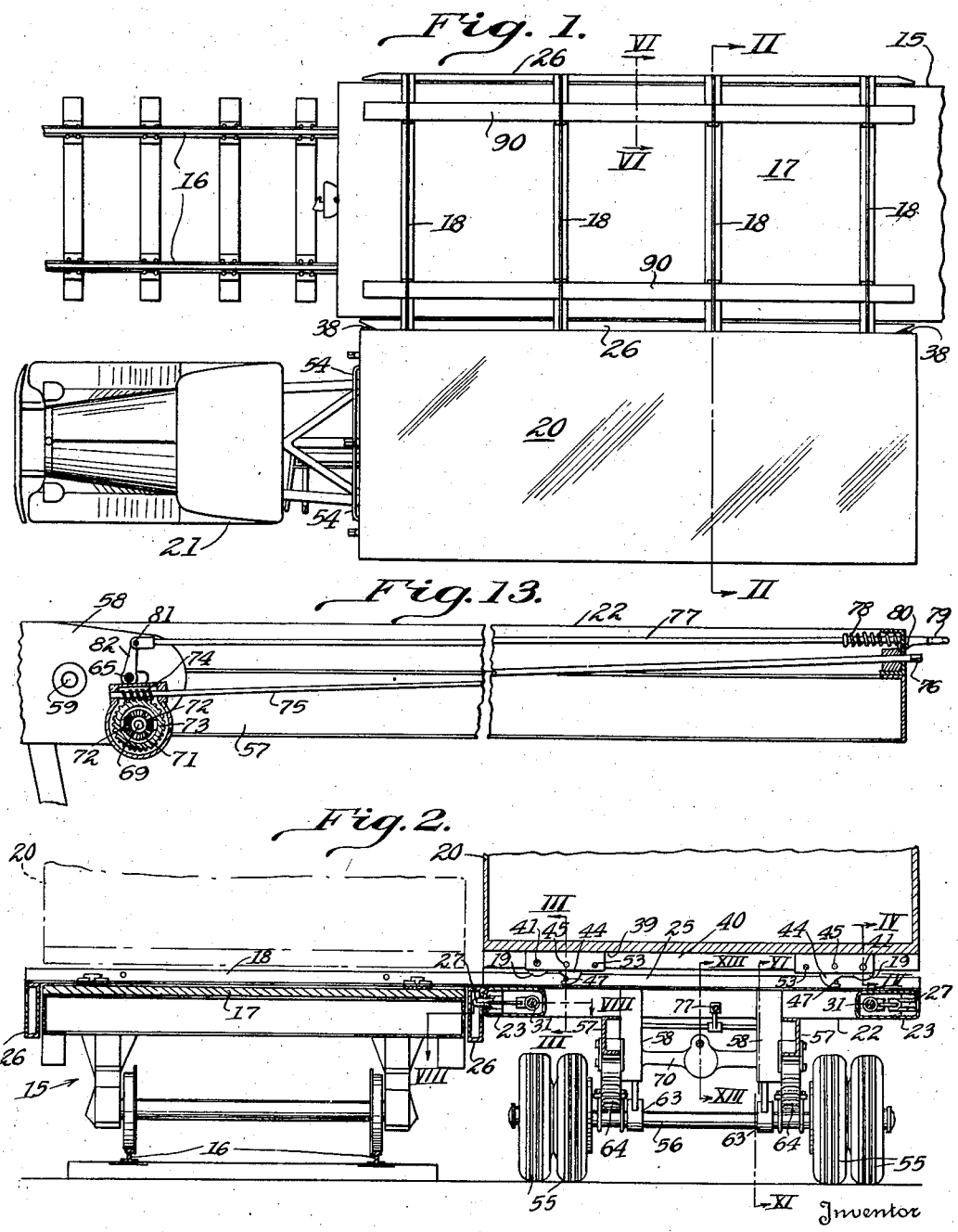

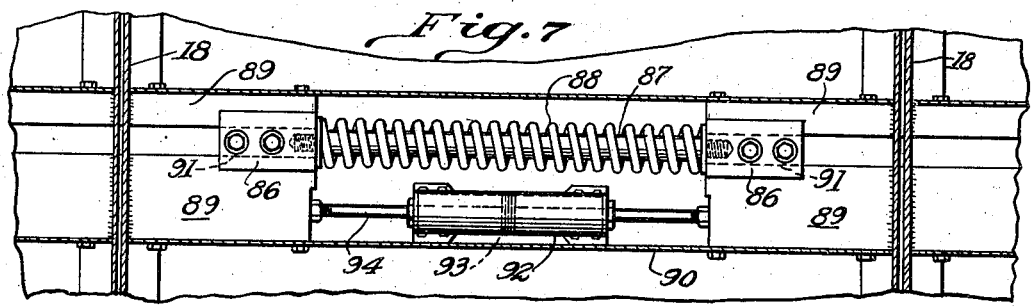
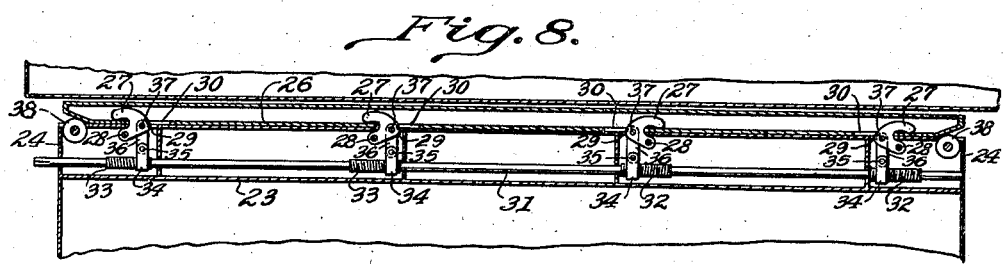
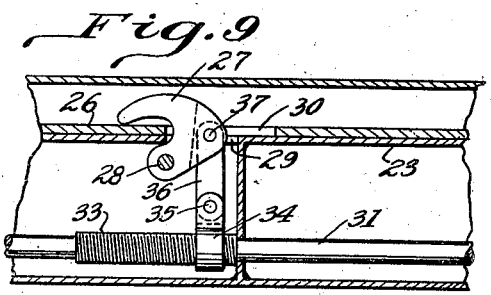
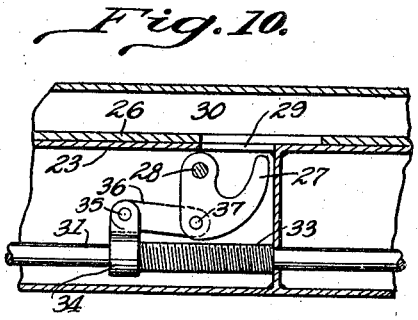
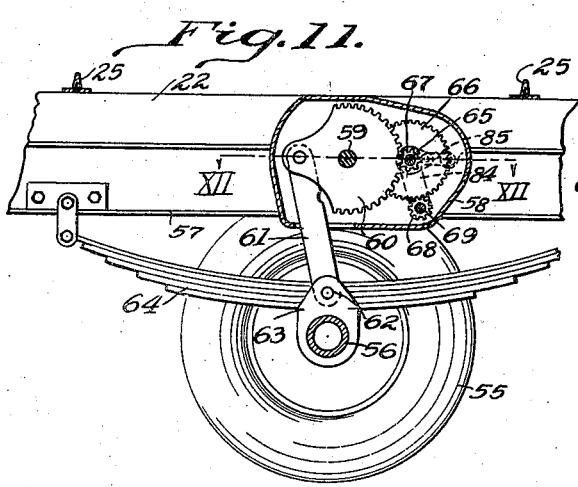
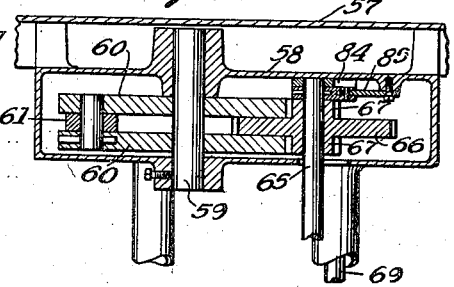

Patented Mar. 14, 1939

2,150,371

UNITED STATES PATENT OFFICE 2,150,371

FREIGHT TRANSPORTING MECHANISM

Arthur H. Furnish, Cardington, Ohio

Application May 31, 1935, Serial No. 24,338

11 Claims. (Cl. 214—38)

This invention relates to an improved system for handling and transporting freight and has particular reference to systems wherein the commodities undergoing transportation are received within closed transporting containers which are adapted to be transported both upon railroad cars and motor driven trucks.

An object of the present invention resides in the provision of a method and means for transferring such containers from a railroad car to the highway truck or from the truck to the car more quickly, safely and economically than can be accomplished with prior systems.

It is another object of the invention to provide apparatus for door to door shipments of freight and express commodities through the use of combined highway truck and railroad car facilities and wherein the truck is provided with an adjustable bed frame capable of being raised or lowered relative to the supporting wheels of the truck and locked in such positions of adjustment so that the bed frame may be horizontally aligned with the flat deck of a railroad car with the bed frame extending parallel and immediately adjacent to the car deck, whereby to facilitate the operation of transferring the closed commodity containers from one of said vehicles to the other.

It is another object of the invention to provide manually operated interlocking means by which the directly adjoining sides of the truck and railroad car may be fastened in secured relationship during the period of transferring the wheeled commodity containers from one vehicle to the other, to the end of avoiding the use of intervening platforms, tracks or other supports for the containers during travel thereof from one vehicle to the other.

Another object resides in the provision of novel means for positively locking the removable shipping containers against movement while retained on the rails of either the highway or railroad vehicles.

Another object of the invention resides in providing the bed frame of the truck vehicle and the flat deck of the track vehicle with transverse rails, capable of being registered in a true horizontal plane, and in providing the bottoms of the containers with wheeled supports which operate on said tracks to facilitate the movement of the container between said vehicles.

A further object of the invention rests in the provision of means for supporting the tracks on the deck of the railroad car to permit said tracks to shift against spring pressure for limited distances longitudinally of the car deck, whereby to provide means for absorbing shock and thrust imparted to said tracks or rails when the weighted commodity containers are placed thereon and particularly during starting and stopping of the railroad car.

Still, a further object of the invention resides in the provision of apparatus of the character indicated which can be simply and readily operated by the driver of the highway truck vehicle, to the end of rendering the apparatus practical, simple and economical to operate and to minimize handling costs.

For a further understanding of the invention, reference is to be had to the following description and to the accompanying drawings, wherein:

Fig. 1 is a top plan view disclosing a railroad car and a motor driven highway vehicle provided with the container transferring apparatus comprising the present invention;

Fig. 2 is a vertical transverse sectional view taken through the railroad car and the highway vehicle on the plane indicated by the line II—II of Fig. 1;

Fig. 3 is an enlarged detail vertical sectional view on the plane indicated by the line III—III of Fig. 2 and disclosing more particularly the mechanism for locking the wheeled commodity containers in connection with the transverse rails of the bed frame of the truck vehicle;

Fig. 4 is a similar view on the plane indicated by the line IV—IV of Fig. 2 and disclosing in transverse section one of the wheeled supports for the commodity container;

Fig. 5 is a detail longitudinal sectional view on the plane indicated by the line V—V of Fig. 3 and disclosing one of the pivoted locking dogs in its active position;

Fig. 5a is a similar view with the pivoted dog in its released or inactive position;

Fig. 6 is a view taken on the line VI—VI of Fig. 1 and disclosing in transverse section the shock absorbing mechanism for the transverse rails of the railroad car;

Fig. 7 is a horizontal sectional view through said shock absorbing mechanism on the line VII—VII of Fig. 6;

Fig. 8 is a horizontal sectional view disclosing the interlocking mechanism for uniting the adjoining side portions of the bed frame of the motor truck vehicle with the deck of the railroad car, the plane of the figure being indicated by the line VIII—VIII of Fig. 2;

Fig. 9 is a similar view on an enlarged scale disclosing one of the pivoted locking members, set forth in Fig. 8, in its active locking position;

Fig. 10 is a similar view disclosing the locking member in its inactive or released position;

Fig. 11 is a vertical sectional view on the line XI—XI of Fig. 2 and setting forth the mechanism for raising and lowering the frame of the highway truck to effect its horizontal registration with the deck of the railroad car;

Fig. 12 is a horizontal sectional view on the line XII—XII of Fig. 11;

Fig. 13 is a vertical longitudinal sectional view disclosing the manual controls for operating the raising and lowering mechanism for the bed frame of the truck, the plane of the figure being indicated by the line XIII—XIII of Fig. 2.

Referring to the drawings, the numeral 15 designates a standard railroad car adapted for wheeled operation over the trackway indicated at 16. The car 15 includes a flat deck or flooring 17 and which in this instance is provided with a plurality of longitudinally spaced, transversely extending rails 18, which are adapted to receive the grooved supporting rollers 19 carried by the bottom of one or more commodity receiving shipping containers 20. These containers may possess any suitable dimensions or cubical capacity and are adapted to include suitable doors providing access to the interior of the containers and which are adapted to be closed or sealed during the transportation of commodities within the containers. Preferably, the containers are of a size so that one thereof may be received and transported by a standard motor driven highway truck of the type indicated at 21, the container being carried by the chassis frame of the truck or of a trailer suitably connected therewith.

The truck 21 is provided with a bed frame 22 which is formed to include hollow side beams 23 which are suitably united at their ends by transverse members 24. Secured to the upper surfaces of the beams 23 are rails 25, which extend transversely of the bed frame 22 in longitudinally spaced parallel order. In the operation of the mechanism, and as shown more particularl in Fig. 2, one of the side beams 23 of the truck 21 is adapted to be positioned immediately adjacent to and in contact with one of the hollow side rails 26 arranged at the sides of the deck 17 of the car 15, and provision is made in the supporting mechanism for the truck bed frame 22 to provide for the raising and lowering of said frame so that the rails 25 of the truck may be brought into and maintained in alignment and horizontal registration with the car rails 18.

During the transference of a shipping container from one vehicle to the other, the inter-engaging portions of the vehicles are locked against relative separation. This is effected, as shown in Figs. 8 to 10, by providing the hollow side beams 23 of the truck with a plurality of hooks 27 which are pivotally mounted as at 28 in the side beams 23 and are capable of being projected through slots 29 formed in the beams 23 from inactive positions, as disclosed in Fig. 10, to the active locking positions, as indicated in Fig. 9. In operation, the slots 29 are registered, through the manipulation of the truck 21, with complemental slots 30 provided in the side rails 26 of the car and the hooks 27 are projected from one position to another by the provision of rotatable screw shafts 31 provided with right and left handed threaded portions 32 and 33 respectively. These threaded portions carry nuts 34 which are pivotally connected as at 35 to links 36, the opposite ends of said links being received within recesses provided in the fastening hooks 27 and are pivotally connected with said hooks, as indicated at 37.

The screw shafts 31 are rotatably supported by suitable bearings within the side beams 23 and project beyond one end of said side beams. The projecting ends of the screw shafts are squared for the reception of a suitable rotating wrench. It will be evident that by rotating the screw shafts, the hooks will be oscillated about their pivotal mountings and when in their active positions, as shown in Fig. 8, will pass through the slots 29 and 30 and will have their outer ends positioned within the hollow side rails 26 in firm holding contact with the walls thereof, thus securing the container supporting platforms of the car and truck vehicles in positively retained relationship preventing relative separation therebetween, assuring alignment of the rails 18 and 25 so that the containers 20 may be readily rolled from one vehicle to the other and avoiding the use of intervening bridges or platforms between the vehicles. To assist in bringing the beams 23 into parallel engagement with the side members 26 of the railroad car, the said beams 23 may be provided at their ends with rollers 38 journaled for rotation about vertical axes. These project beyond the sides of the beams 23 in order to engage with the side members 26 and to minimize friction between the adjoining parts of the car and truck frames when the same are being brought into the registering relation disclosed in Figs. 1 and 8. If desired, the ends of the side members 26 may be beveled to facilitate this operation.

To support the grooved rollers 19, the bottoms 39 of the containers 20 are provided with depending welded, or otherwise fastened, channel members 40. These channel members receive the centrally grooved rollers 19 which at the opposite ends of said members are supported by longitudinally extending shafts 41, which extend lengthwise of the containers beneath the same. The shafts 41 are secured for rotation with their associated rollers by the set screws 42, or their equivalents, as shown in Fig. 4, and the outer ends of the shafts 41 are squared for the reception of a rotating wrench by which certain of the rollers may be revolved manually to effect movement of the containers 20 over the rails 18 and 25. These rails, as shown in Fig. 3, are preferably of inverted T-form and include upstanding webs 43 along the upper surfaces of which the rollers 19 operate.

In order to lock the containers 20 against movement, while positioned on the rails of either the truck or car, the channel members 40 are each provided, as shown in Figs. 3 and 5, with a pair of pivoted locking dogs 44. These dogs are disposed intermediately of the length of the channel members 40 and are arranged between the grooved rollers 19 carried by the ends of said members. The dogs are mounted upon transversely extending bolts 45 and are formed to include locking recesses 46 which when said dogs occupy their active positions, as shown in Fig. 5, receive the ends of fixed cross pins 47 which project from the webs 43 of the truck and car rails. To control the operating positions of said dogs, the latter are formed in their upper portions with angularly arranged slots 48, which receive sliding blocks 49 pivotally carried by the ends of studs 50, which project laterally from sliding rack bars 51 mounted in the upper portions of the channel members 40. These rack bars are provided with teeth which engage with toothed pinions 52 mounted on longitudinally extending shafts 53 which are rotatably carried by the bottoms of the shipping containers.

The shafts 53 at the ends of the containers are provided with throw cranks 54 which may be manually rocked to rotate the shafts 53. This rotation of the shafts causes longitudinal movement of the bars 51 so that the dogs 44 may be rocked from their inactive positions, as shown in Fig. 5a, wherein the dogs lie within the confines of the channel members, to their active positions, as disclosed in Fig. 5, wherein the dogs engage with the cross pins 47 to securely lock the containers rigidly against movement on the truck and track rails. By reference to Fig. 2, it will be noted that the dogs 44 on opposite sides of the container are reversely disposed so that when said dogs are actively positioned, as indicated in Fig. 2, movement of the containers longitudinally of the car or truck rails will be effectively prevented. Any suitable means may be provided at the ends of the containers for engaging the cranks 54 to hold the latter against undesired movement while the locking dogs are actively positioned.

By reference to Fig. 2, it will be noted that when the car and truck frames are disposed in a registering horizontal plane and said frames securely locked together by the pivoted coupling hooks 27, the cranks 54 may be rotated in order to oscillate the dogs 44 to their inactive positions. Then, by manually rotating the shafts 41, the rollers 19 may be rotated in a direction to advance the shipping container from its position on the truck frame, as shown in full lines in Fig. 2, to a supported position on the rails of the car deck, as indicated by broken lines in Fig. 2. When positioned on the car deck, the shafts 53 are rotated so that the dogs 44 will engage with the cross pins 47 of the rails 18, thus locking the container in connection with said car rails. It will be noted that all of these operations may be easily effected by a single operator.

In order to control the raising and lowering of the bed frame 22 of the truck relative to its ground engaging wheels 55 and their associated axle housings 56, the channel frames 57 of the chassis of said truck, on which the superposed bed frame 22 is mounted, are provided with housings 58 in which are arranged stationary axles 59. As shown in Figs. 11 and 12, these axles each support spaced gear segments 60 between which are pivotally secured the upper ends of links 61, the latter having their lower ends pivotally connected as at 62 in connection with bearings 63 carried by the axle housings 56. It will be seen that by rotating the gear segments 60, the truck chassis may be raised or lowered independently of the supporting springs 64, which are normally arranged between the axle housings and the vehicle chassis.

During normal operation of the truck vehicle, such as when it is being driven over a street or highway, the gear segments 60 are disengaged from the mechanism provided for rotating the same, so that the normal action of the springs 64 in absorbing road shock takes place. However, when the truck vehicle is driven alongside of the railroad car for container transfer purposes, it is sometimes necessary, although not always, to raise or lower the truck frame so that it may be evenly registered with the car deck to provide for the aforesaid coupled union 27 between the vehicle frames or bodies and, moreover, to maintain the truck frame locked against vertical movement in such horizontal registration.

These ends are attained by the provision in each of the housings 58 of a floating shaft 65 at each end of which is fixed a gear 66, which lies between the gear segments 60. The hub of the gear 66 is formed with oppositely disposed toothed pinions 67 which may be moved into and out of engagement with the teeth of the segments 60.

Each of the gears 66 meshes with a pinion 68 fixed upon the ends of transversely extending differential shafts 69. These shafts are mounted for rotation in connection with the differential housing 70 and, as shown in Fig. 13, the adjoining ends of the shaft 69 carry bevel gears 71 which mesh with beveled pinions 72 mounted on a conventional ring gear 73. The teeth on the perimeter of the gear 73 mesh with a worm 74 provided on one end of a shaft 75 which is suitably mounted for rotation in connection with the frame of the truck and has the projecting end thereof squared as at 76 for the reception of a rotating tool. By rotating the shaft 75, the ring gear 73 will be revolved and with it the pinion 72, causing the rotation of the gears 71 and the differential shaft 69. This differential mechanism is provided in order that should the truck wheels be on an angle or slope with respect to the horizontal and one side should rise faster than the other, the truck bed may be restored to level following the coupling of the truck and car frames.

The movement of the gear pinion 67 into and out of engagement with the teeth of the gear segments 60 is regulated, as shown in Fig. 13, by providing the truck frame with a longitudinally extending shaft 77. This shaft adjacent to one end of the truck frame is provided with a collar, and between said collar and the end cross member of the truck frame, the shaft 77 is surrounded by a coil spring 78. The outer end of the shaft 77 terminates in a handle 79 which, upon being pulled, causes the reciprocation of said shaft against the resistance offered by the coil spring 78 and when the shaft 77 has been pulled a sufficient distance to bring the pinions 67 into meshing engagement with the gear segments 60, a shoulder 80 on the shaft 77 will engage with the stationary part of the truck frame so that such active engagement of the pinions 67 with the segments 60 may be maintained while the shaft 75 is being rotated to raise and lower the truck frame.

The inner end of the shaft 77 is connected with a crank arm 82, as shown in Fig. 2. The lower end of the crank arm 82 is connected with the transverse shaft 65 which has its ends slidably mounted in slots 83, formed in connection with the outer walls of the housings 58. The ends of the shaft 65 are connected with swinging bearings 84 extending upwardly from the differential shafts 69, and pivoted guide links 85 are joined with the inner portions of said shaft and with stationary parts of the housings 58, in order that upon reciprocating the shaft 77, by pulling the same in an outward direction, the driving relation between the pinions 67 and the gears 60 may be controlled.

When the containers 20 are locked on the rails 18 of the car deck, it is desirable to provide a cushioning means for admitting of some movement of the car rails lengthwise of the deck 17. This is especially true for the purpose of absorbing shock and unnecessary strain on the container supports during sudden starting and stopping of the railroad car, and to prevent injury to and breakage of parts. This may be conveniently accomplished, as shown in Figs. 6 and 7, by securing to the flooring or deck of the car between the rails 18, pairs of longitudinally spaced stationary blocks 86. Each pair of blocks is united by a rod 87 and confined between said blocks and surrounding the rods 87 is a strong coil spring 88. The car rails 18 have their webs engaged with horizontal metallic plates 89 which are disposed within sheet metal dust excluding housings 90 and are slidably received within the side grooves 91 provided in the blocks 86.

The plates 89 are separated by the springs 88 which, as shown in Fig. 6, have their ends positioned in direct engagement with the adjoining end portions of the plates 89 so that the tendency of said springs is to maintain the rails 18 in their normal positions. This action may be supplemented by the provision of cylinders 92, rigidly secured to the car deck. Each of these cylinders contains a piston 93 and a piston rod 94, the ends of the latter being directly connected with the ends of the plates 89. Movement of the piston 93 within each of the cylinders 92 is resisted preferably by compression of an elastic fluid. Thus, resilient spacers are provided between the rails 18 so as to permit of limited movement of said rails longitudinally of the car body, which movement is sufficient to relieve the rails and the container supports of the stresses and strains which are set up at the time of starting and stopping the movement of the railroad car.

In view of the foregoing, it will be seen that the present invention provides a practical, economical and efficient system for effecting the transfer of large bulky and heavy shipping containers between track and road vehicles. The apparatus is strong and substantial and well adapted to withstand the severe usage to which mechanism of this character is subjected without requiring undue attention or replacement of worn and broken parts. The apparatus is essentially simple and its operation may be governed in effecting container transfer by a single person. The system provides for low cost transportation of freight and express shipments and unusual convenience to consignors and consignees. It is more economical than highway transportation alone since loaded vehicle bodies, without men in charge, can be moved by rail between cities and towns cheaper and in most cases more rapidly than highway trucks operating under their own power and driven the same distance.

It is more economical than the usual railroad service with drayage at each end to provide the necessary pick-up and delivery, since it eliminates the unloading, trucking across platforms and reloading into cars at rail terminals and junction points. Because the transfer of loaded rail-truck bodies can be effected in the yards where trains are made up and arrive, it eliminates much of the delay and expense of switching cars to and from private siding and freight house platforms.

The present invention is considered to be more efficient than other methods of handling loaded freight containers for the reason that it does not require the use of expensive cranes or other intermediate loading and unloading devices. Again, it saves money and time by eliminating the switching of cars to such cranes or unloading devices and, ordinarily, requires the services of no employees other than the driver of the truck to effect the transfer of the containers.

What is claimed is:

1. Mechanism for handling and transporting freight in shipping containers which are bodily transferable from highway to railroad vehicles and wherein the containers each possess a length greater than the width of the railroad vehicle, comprising a container-receiving bed frame for the highway vehicle, a plurality of pivoted coupling members carried by said bed frame and mounted adjacent to at least one of its longitudinal sides, a container receiving platform for the railroad vehicle, said platform having at least one of its longitudinal sides provided with a plurality of sockets, and means for moving said coupling members into and out of inter-locking engagement with the sockets of said platform whereby to retain the frame of the highway vehicle in abutting horizontal registration and locked engagement with the side of the railroad vehicle platform during transference of said containers from one vehicle to the other.

2. Mechanism for handling and transporting freight in shipping containers which are bodily transferable from highway to railroad vehicles, comprising a container-receiving bed frame for the highway vehicle, a plurality of movable coupling members carried by said bed frame and mounted adjacent to at least one of its longitudinal sides, a container receiving platform for the railroad vehicle, said platform having at least one of its longitudinal sides provided with a plurality of sockets, and means for moving said coupling members into and out of inter-locking engagement with the sockets of said platform whereby to retain the frame of the highway vehicle in abutting and locked engagement with the side of the railroad vehicle platform in horizontal registration therewith during transference of said containers from one vehicle to the other.

3. Mechanism for handling and transporting freight in shipping containers which are bodily transferable from highway to railroad vehicles and wherein the containers each possess a length greater than the width of the railroad vehicle, comprising a container-receiving bed frame for the highway vehicle, a plurality of movable coupling members carried by said bed frame and mounted adjacent to at least one of its longitudinal sides, a container receiving platform for the railroad vehicle, said platform having at least one of its longitudinal sides provided with a plurality of sockets, means for moving said coupling members into and out of inter-locking engagement with the sockets of said platform whereby to retain the frame of the highway vehicle in abutting and locked engagement with the side of the railroad vehicle platform during transference of said containers from one vehicle to the other, and transversely disposed track rails arranged on said bed frame and platform and disposed in horizontal registering relationship with each other when said bed frame is directly coupled with said platform, said rails being adapted for the reception of supporting wheels provided on the bottoms of said containers.

4. Mechanism for handling and transporting freight in shipping containers adapted for bodily transference from highway to railroad vehicles, comprising a container-receiving frame for the highway vehicle, a plurality of pivoted hook-shaped coupling members carried by one of the longitudinal sides of said frame, said coupling members when inactively disposed lying within the confines of said frame, a screw shaft rotatably mounted in said frame and extending longitudinally thereof, threaded means engageable with said shaft and connected with said coupling members for moving the same between their inactive positions within said frame to active extended positions wherein the outer portions of said coupling members project beyond said frame, and a railroad vehicle including a platform having one of its longitudinal sides provided with sockets formed for the reception of the outer portions of said coupling members when the latter occupy their extended positions.

5. Mechanism for handling and transporting freight in shipping containers of the type which are bodily transferable from highway to railroad vehicles, comprising a container-receiving bed frame for a highway vehicle, a plurality of pivotally horizontally arranged movable coupling members carried by said bed frame and mounted adjacent to at least one of its longitudinal sides, said coupling members lying within the confines of said bed frame when in their retracted or inactive positions and projecting beyond the sides of said bed frame when in projected or active positions, a rotatably journaled screw shaft carried by said bed frame, and link connections movable by the rotation of said screw shaft to control the operating positions of said coupling members.

6. Mechanism for handling and transporting freight in shipping containers which are bodily transferable from highway to railroad vehicles, comprising a container-receiving bed for the highway vehicle, a container-receiving platform for the railroad vehicle, stationary transversely extending rails secured to the bed and platform of said vehicles adapted for the reception of rollers on the bottoms of the shipping containers, primary adjusting mechanism cooperative with the bed of said highway vehicle for raising and lowering the horizontal plane of said bed into approximate registration with that of the platform of said railroad vehicle, and coupling means directly connecting in side by side abutting relationship the adjoining longitudinal sides of said bed and platform and maintaining in aligned relationship the ends of the transverse rails.

7. In mechanism for handling and transporting freight in shipping containers, a pair of vehicles adapted to be positioned side by side and both having container-receiving beds substantially in horizontal registration when the vehicles are side by side, a plurality of spaced movable coupling members mounted adjacent to the longitudinal sides of one of said beds, spaced receivers for said coupling members formed with the adjoining longitudinal side of the other of said beds, and means for simultaneously moving said coupling members into locking engagement with said receivers to directly connect said beds in horizontally aligned side by side abutting relationship.

8. Mechanism for handling and transporting freight in shipping containers which are bodily transferable from highway to railroad vehicles, comprising a highway vehicle having a container-receiving body, a railroad vehicle having a container-receiving body, a plurality of pivotally movable coupling members mounted adjacent to at least one of the longitudinal sides of one of said bodies, receivers for said coupling members carried by the adjoining longitudinal side of the other of said bodies, primary adjusting means carried by the highway vehicle for raising and lowering the body thereof to register the same horizontally with the body of the railroad vehicle, and means for moving said coupling members into interlocking engagement with said receivers and drawing said vehicle bodies together.

9. In mechanism for handling and transporting freight in shipping containers which are bodily transferable from highway to railroad vehicles, a container-receiving deck, a plurality of spaced pivotally mounted hook-shaped coupling members provided at one of the longitudinal sides of said deck, certain of said coupling members having the hook-shaped ends thereof directed toward one end of said deck and the other of said coupling members having their hook-shaped ends directed toward the opposite end of said deck, and means for simultaneously moving said coupling members to project the hook-shaped ends thereof beyond the confines of the longitudinal side of said deck on which the coupling members are positioned, said coupling members when in their projected positions being received within sockets provided therefor in the longitudinal side of the deck of an adjoining vehicle.

10. In mechanism of the character described, a highway vehicle having a container-receiving body, a plurality of pivoted longitudinally spaced coupling hooks carried by one of the longitudinal sides of said body, said hooks lying within the confines of said body when in their retracted positions and projecting beyond the sides of the body when in their extended positions, a rotatable shaft extending longitudinally of said body contiguous to said hooks, said shaft being provided with right and left-handed threaded portions, and links carried by the threaded portions of said shaft and connected with said hooks.

11. Mechanism for handling and transporting freight in shipping containers adapted for bodily transference from highway to railroad vehicles, comprising a container-receiving body for the highway vehicle, a plurality of pivoted hook-shaped coupling members carried by one of the longitudinal sides of said body, certain of said coupling members facing the front and others facing the rear of said body, a railroad vehicle having a container-receiving body formed with longitudinally spaced sockets in one of its sides, means for raising and lowering the body of the highway vehicle to horizontally register the body of the highway vehicle with that of the railroad vehicle, and means for simultaneously actuating said coupling member so that when the latter occupy their projected positions, the same will be received within the sockets of the railroad vehicle body to maintain the adjoining sides of the vehicle bodies in direct abutting contact and in longitudinal, horizontal and vertical positions of registration.

ARTHUR H. FURNISH.